United States Patent [19]

Ohtomo

[11] Patent Number: 5,457,804
[45] Date of Patent: Oct. 10, 1995

[54] ACCUMULATING MULTIPLICATION CIRCUIT EXECUTING A DOUBLE-PRECISION MULTIPLICATION AT A HIGH SPEED

[75] Inventor: Hiroyasu Ohtomo, Tokyo, Japan

[73] Assignee: NEC Corporation, Tokyo, Japan

[21] Appl. No.: 75,238

[22] Filed: Jun. 10, 1993

[30] Foreign Application Priority Data

Jun. 10, 1992 [JP] Japan .................................. 4-150204

[51] Int. Cl.$^6$ ........................................ G06F 7/38
[52] U.S. Cl. .......................... 395/800; 364/736; 364/754; 364/258.2; 364/DIG. 1
[58] Field of Search ........................... 395/800, 775, 395/425, 375; 364/736, 741, 746.2, 748, 750.5, 754–760, 764–765, 768, 778–788

[56] References Cited

U.S. PATENT DOCUMENTS

| | | | |
|---|---|---|---|
| 4,817,047 | 3/1989 | Nishitami et al. | 364/754 |
| 4,852,037 | 7/1989 | Aoki | 364/736 |
| 4,958,312 | 9/1990 | Ang et al. | 364/754 |
| 5,235,536 | 8/1993 | Matsubishi et al. | 364/736 |
| 5,285,403 | 2/1994 | Quisquater et al. | 364/736 |
| 5,287,299 | 2/1994 | Lin | 364/759 |

Primary Examiner—Alyssa H. Bowler
Assistant Examiner—Alpesh M. Shah
Attorney, Agent, or Firm—Whitham, Curtis, Whitham & McGinn

[57] ABSTRACT

An accumulating multiplication circuit comprises a multiplication part receiving first and second input data, each composed of "n" bits, so as to output a first 2n-bit data of a partial product of the first and second input data, and a shifter for shifting the "2n-bit" data, which is the subject of the arithmetical operation, rightward by "n" bits. An arithmetical operation part receives the first 2n-bit data and the right-shifted 2n-bit data so as to output a third 2n-bit data. Thus, a double-precision multiplication can be efficiently executed.

11 Claims, 2 Drawing Sheets

ACCUMULATING MULTIPLICATION CIRCUIT EXECUTING A DOUBLE-PRECISION MULTIPLICATION AT A HIGH SPEED

BACKGROUND OF THE INVENTION

1. Field of the Invention

The present invention relates to an accumulating multiplication circuit, and more specifically to an accumulating multiplication circuit having a function of executing a double-precision multiplication at a high speed.

2. Description of Related Art

A conventional accumulating multiplication circuit is basically constituted of a multiplication part and an arithmetical operation part, and operates as follows: The multiplication part receives two items of data of for example "n" bits, and outputs data of "2n" bits. The arithmetical operation part receives the data of "2n" bits outputted by the multiplication part and another data of "2n" bits, and outputs data of "2n" bits.

By using this conventional accumulating multiplication circuit, a multiplication of "2n" bits×"2n" bits expressed in the 2'complement, that is, a double-precision multiplication will be executed as follows:

Here, supposing that a multiplicand and a multiplier are A and B, respectively, in the case of executing the multiplication of two numbers of "2n" bits, expressed in the 2'complement, the multiplicand and the multiplier can be expressed in the following formulas:

$$A = -a_0 \cdot 2^0 + \sum_{i=1}^{2n-1} a_i \cdot 2^{-i} \quad (1)$$

$$B = -b_0 \cdot 2^0 + \sum_{j=1}^{2n-1} b_j \cdot 2^{-j} \quad (2)$$

Supposing that a product of A and B is P, P is shown by the following formula:

$$P = \left( -a_0 \cdot 2^0 + \sum_{i=1}^{2n-1} a_i \cdot 2^{-i} \right) \cdot \left( -b_0 \cdot 2^0 + \sum_{j=1}^{2n-1} b_j 2^{-j} \right) \quad (3)$$

$$= \left\{ \left( -a_0 \cdot 2^0 + \sum_{i=1}^{n-1} a_i \cdot 2^{-i} \right) + \left( \sum_{i=n}^{2n-1} a_i \cdot 2^{-i} \right) \right\} \cdot \quad (4)$$
$$\left\{ \left( -b_0 \cdot 2^0 + \sum_{j=1}^{n-1} b_j \cdot 2^{-j} \right) + \left( \sum_{j=n}^{2n-1} b_j \cdot 2^{-j} \right) \right\}$$

$$= \left\{ \left( -a_0 \cdot 2^0 + \sum_{j=1}^{n-1} a_i \cdot 2^{-i} \right) + 2^{-n} \cdot \sum_{i=0}^{n-1} a_{n+i} \cdot 2^{-i} \right\} \cdot \quad (5)$$
$$\left\{ \left( b_0 \cdot 2^0 + \sum_{j=1}^{n-1} b_j \cdot 2^{-j} \right) + 2^{-n} \cdot \sum_{j=0}^{n-1} b_{n+i} \cdot 2^{-j} \right\}$$

Here, supposing that Q,R,S and T are expressed by the formulas (6) to (9), respectively, P can be shown by the following formula (10):

$$Q = -a_0 \cdot 2^0 + \sum_{i=1}^{n-1} a_i \cdot 2^{-i} \quad (6)$$

$$R = -b_0 \cdot 2^0 + \sum_{j=1}^{n-1} b_j \cdot 2^{-j} \quad (7)$$

$$S = \sum_{j=0}^{n-1} a_{n+i} \cdot 2^{-i} \quad (8)$$

$$T = \sum_{j=0}^{n-1} b_{n+j} \cdot 2^{-j} \quad (9)$$

$$\begin{aligned} P &= (Q + 2^{-n} \cdot S) \cdot (R + 2^{-n} \cdot T) \\ &= Q \cdot R + 2^{-n} \cdot (Q \cdot T + S \cdot R) + 2^{-2n} \cdot S \cdot T \end{aligned} \quad (10)$$

Thus, the double-precision multiplication of "2n" bits can be executed by executing the following four kinds of single-precision multiplication and also executing the shift and addition for weighting of $2^{-2n}$ or $2^{-n}$ in accordance with the formula (10).

Q·R: 2'complement×2'complement
Q·T: 2'complement×Absolute value
S·R: Absolute value×2'complement
S·T: Absolute value×Absolute value In this case, the total number of the operations is six in the whole, that is, one accumulating multiplication of a 2'complement×a 2'complement, two accumulating multiplications of a 2'complement×an absolute value, one multiplication of an absolute value×an absolute value and two n-bit shifts. Namely, the required operation time is six times longer than that of the single-precision operation.

As mentioned above, in the case of executing a double-precision operation to obtain the operation results of "2n" bits, the conventional accumulating multiplication circuit as mentioned above requires the operation time six times as long as that of the single-precision multiplication. Further, it requires two times of saving of data carried over by the shifting in order to obtain the operation result of "4n" bits.

SUMMARY OF THE INVENTION

Accordingly, it is an object of the present invention to provide an accumulating multiplication circuit which has overcome the above mentioned defect of the conventional one.

Another object of the present invention is to provide an accumulating multiplication circuit capable of shortening the operation time required for obtaining a double-precision operation result.

The above and other objects of the present invention are achieved in accordance with the present invention by an accumulating multiplication circuit in accordance with the present invention, comprising a multiplication part to execute an operation for first and second input data, composed of "n" bits, respectively, and to output a first 2n-bit data, an arithmetical operation part to execute an operation for said first 2n-bit data and a second 2n-bit data and to output a third 2n-bit data, and a shifter for shifting said second 2n-bit data rightward by "n" bits so as to generate input data for said arithmetical operation part.

More specifically, the multiplication part comprises:

first to four registers for holding the most significant "n" bits of a multiplier, where "n" is a positive integer, the least significant "n" bits of the multiplier, the most significant "n" bits of a multiplicand, and the least significant "n" bits of the multiplicand, respectively, a first multiplexor for selecting either an output data of the first register or an output data of the second register, so as to supply the selected output data, a Booth's decoder receiving the selected output data outputted from the first multiplexor, a second multiplexor for selecting either an output data of the third register or an output data of the fourth register, so as to supply the selected output data, a partial product generating circuit receiving an output of the Booth's decoder and an output of the second multiplexor, for generating partial product, and a partial product adder circuit receiving the partial product from the partial product generating circuit.

In addition, the arithmetical operation part comprises:

fifth and sixth registers for respectively holding the most significant "n" bits and the least significant "n" bits of data used for the arithmetical operation with the product generated in the multiplication part a third multiplexor having a first input receiving the "2n" bit-data held in the fifth and sixth registers, a second input receiving 0 and a third input, a shifter receiving an output data of the third multiplexor for shifting the received data rightward by "n" bits, a fourth multiplexor selecting either the output data of the third multiplexor or an output data of the shifter 31 so as to supply the selected data, an arithmetical operation circuit receiving an output of the fourth multiplexor and an output of the partial product adder circuit, for outputting a "2n-bit" output data which is a result of the operation, an output of the arithmetical operation circuit being supplied to the third input of the third multiplexor, and seventh and eighth registers respectively receiving and holding the most significant "n" bits and the least significant "n" bits of the "2n-bit" output data outputted from the arithmetical operation circuit.

In one preferred embodiment, the arithmetical operation part further includes ninth and tenth registers for receiving and holding data including the first bit to the "n-th" bit of the data outputted by the shifter, and data including the (n-1)th bit to "2n-th" bit of the data outputted by the shifter.

The above and other objects, features and advantages of the present invention will be apparent from the following description of preferred embodiments of the invention with reference to the accompanying drawings.

DESCRIPTION OF THE PREFERRED EMBODIMENTS

Figure 1:
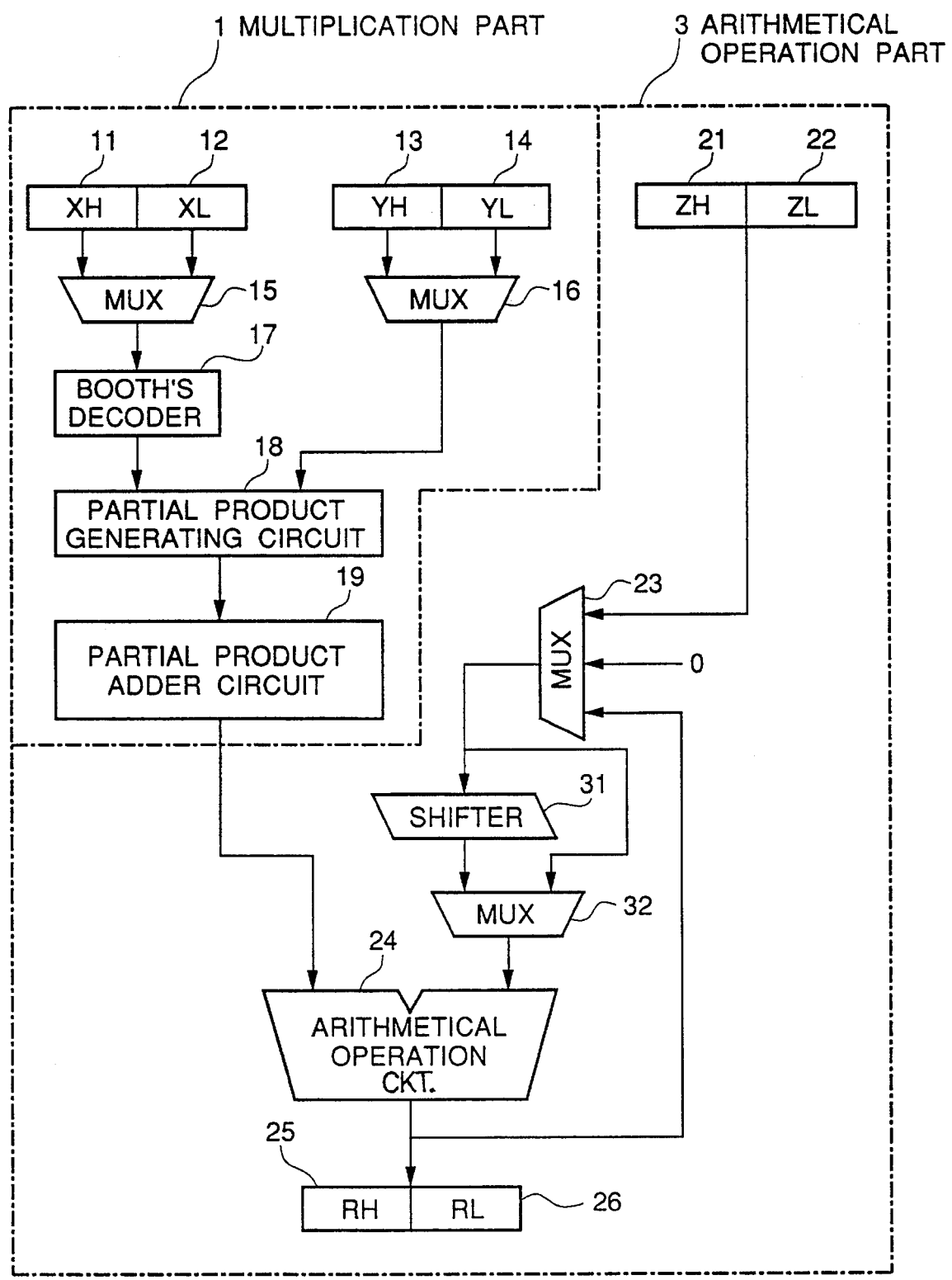
FIG. 1 is a block diagram illustrating a first embodiment of the accumulating multiplication circuit in accordance with the present invention.

Referring to FIG. 1, there is shown a block diagram illustrating a first embodiment of the accumulating multiplication circuit in accordance with the present invention.

The shown accumulating multiplication circuit is constituted of a multiplication part 1 and an arithmetical operation part 3. The multiplication part 1 comprises registers 11 to 14 for holding the most significant "n" bits XH of a multiplier, the least significant "n" bits XL of the multiplier, the most significant "n" bits YH of a multiplicand, and the least significant "n" bits YL of the multiplicand, respectively, a multiplexor 15 for selecting either an output data of the register 11 or an output data of the register 12, so as to supply the selected output data to a Booth's decoder 17, and a multiplexor 16 for selecting either an output data of the register 13 or an output data of the register 14, so as to supply the selected output data to a partial product generating circuit 18. This partial product generating circuit 18 also receives an output of the Booth's decoder 17, and generates a partial product to a partial product adder circuit 19.

The arithmetical operation part 3 comprises registers 21 and 22 for holding the most significant "n" bits ZH and the least significant "n" bits ZL of data used for the arithmetical operation with the product, respectively, and a multiplexor 23 for selecting one from the "2n" bit-data held in the registers 21 and 22, 0 and an output of an arithmetical operation circuit 24.

The arithmetical operation part 3 further comprises a shifter 31 receiving the output data of the multiplexor 23 for shifting the received data rightward by "n" bits, and a multiplexor 32 selecting either an output data of the multiplexor 23 or an output data of the shifter 31 so as to supply the selected data to an arithmetical operation circuit 24. The arithmetical operation circuit 24 also receives an output of the partial product adder circuit 19, and outputs a "2n-bit" output data which is a result of the operation. A pair of registers 25 and 26 respectively hold the most significant "n" bits RH and the least significant "n" bits RL of the "2n-bit" output data outputted from the arithmetical operation circuit 24.

Now, operation of this embodiment will be described.

At first, the multiplexor 15 of the multiplication part 1 selects either the "n-bit" data XH held in the register 11 or the "n-bit" data XL held in the register 12, and supplies the selected data to the Booth's decoder 17. The multiplexor 16 also selects either the "n-bit" data YH held in the register 13 or the "n-bit" data YH held in the register 14, and supplies the selected data to the partial product generating circuit 18. The partial product generating circuit 18 generates a partial product of an output of the Booth's decoder 17 and an output of the multiplexor 16. The partial product adder circuit 19 sums the partial product generated by the partial product generating circuit 18, and outputs the summed result to the arithmetical operation part 3 as a "2n-bit" data. The multiplexor 23 of the arithmetical operation part 3 selects one from the "2n-bit" data ZH and ZL held in the registers 21 and 22, 0 and an output of the arithmetical operation circuit 24, and outputs the selected data to the shifter 31 and the multiplexor 32. The shifter 31 shifts the data supplied from the multiplexor 23 rightward by "n" bits, and supplies the shifted data to the multiplexor 32. The multiplexor 32 selects either the output of the shifter 31 or the output of the multiplexor 32, and outputs the selected output to the arithmetical operation circuit 24. The arithmetical operation circuit 24 receives the output data of the partial product adder circuit 19 of the multiplication part 1 and the output data of the multiplexor 32, and at least calculates a sum of the two received outputs so as to output the operation results RH and RL to the registers 25 and 26 and the multiplexor 23, respectively.

In the case of executing a double-precision multiplication by the accumulating multiplication circuit of this embodiment, the operation will be executed as follows;

$$R1 = 0 + XL \times YL \qquad (11)$$

$$R2 = 2^{-n} \times R1 + XH \times YL \quad (12)$$

$$R3 = R2 + XL \times YH \quad (13)$$

$$R4 = 2^{-n} \times R3 + XH \times YH \quad (14)$$

Namely, it is possible to execute a double-precision operation, which had required six instructions in the conventional accumulating multiplication circuit, by four instructions as mentioned above. In addition, the shift processing in the arithmetical operation part 3 can be carried out in parallel with the operation performed in the multiplication part 1, so that the operation time never increases.

Then, a second embodiment of the present invention will be explained.

Figure 2:
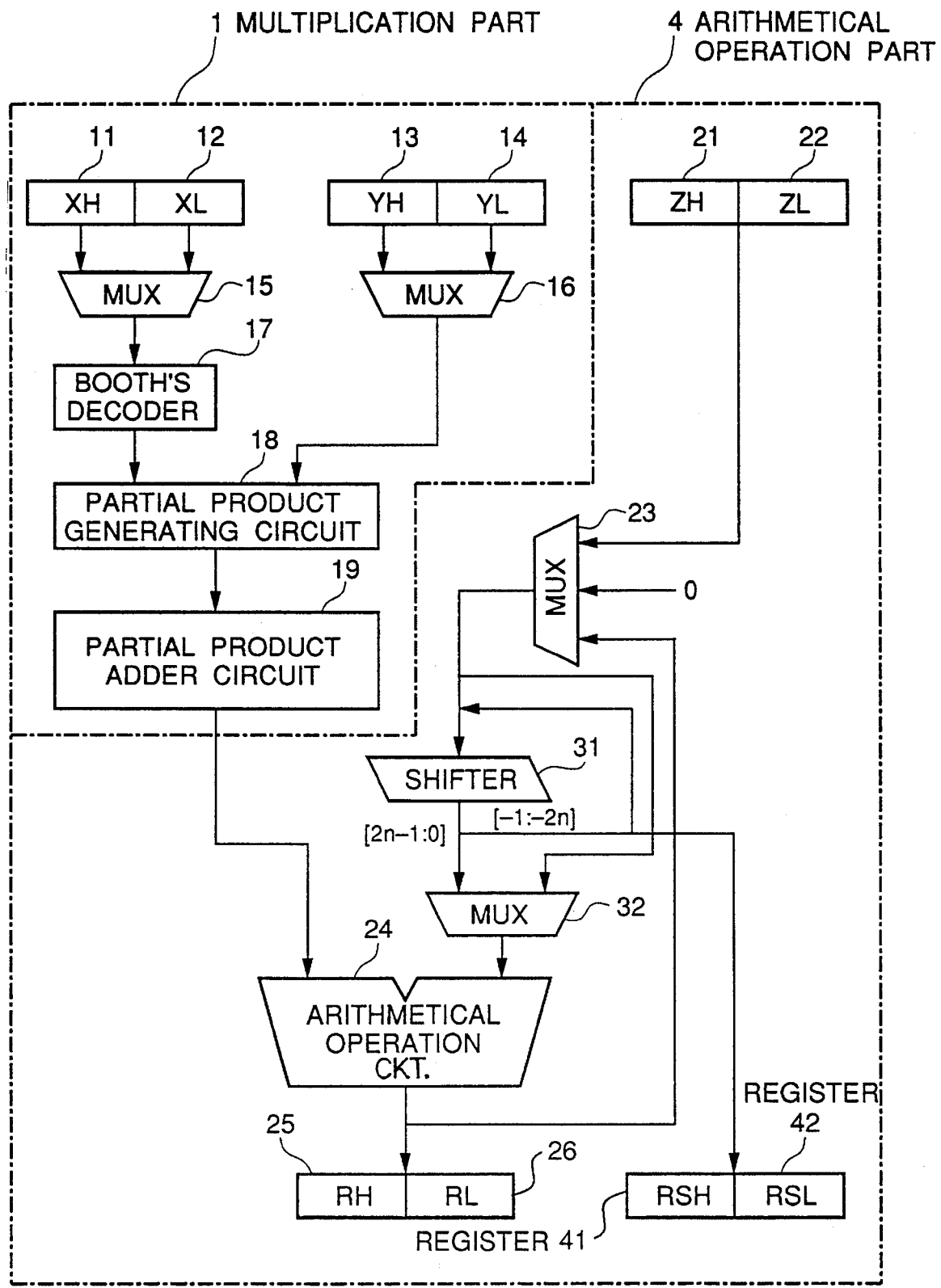
FIG. 2 is a block diagram illustrating a second embodiment of the accumulating multiplication circuit in accordance with the present invention.

FIG. 2 is a block diagram illustrating a second embodiment of the accumulating multiplication circuit in accordance with the present invention. In FIG. 2, elements similar to those shown in FIGS. 1 are given the same Reference Numerals, and explanation thereof will be omitted.

The circuit of the second embodiment differs from that of the first embodiment in that, the arithmetical operation part 3 is replaced with an arithmetical operation part 4 which includes, in addition to the elements included in the arithmetical operation part 3, registers 41 and 42 for holding data RSH including the first bit to the "n-th" bit of the data outputted by the shifter 31, and data RSL including the (n–1)th bit to "2n-th" bit of the data outputted by the shifter 31, respectively.

With this arrangement, the result of the multiplication is held as follows: The registers 25, 26, 41 and 42 hold the data from (4n–1)-th bit to "3n-th" bit, the data from (3n–1)-th bit to "2n-th bit", the data from (2n–1)-th bit to "n-th" bit, and the data from (n–1)th bit to "0th" bit, respectively. Further, similarly to the first embodiment, the shift processing in the arithmetical operation part 3 can be executed in parallel with the operation in the multiplication part, so that the operation time never increases. In addition, since the saving of the data carried over by the shift processing can be effected, it is possible to execute a double-precision multiplication without deteriorating the precision.

As mentioned above, the accumulating multiplication circuit in accordance with the present invention comprises a shifter for shifting the "2n-bit" data, which is the subject of the arithmetical operation, rightward by "n" bits, so as to generate an input data for the arithmetical operation part, so that the shift processing in the arithmetical operation part can be executed in parallel with the operation in the multiplication part, which permits it to efficiently execute a double-precision multiplication.

The invention has thus been shown and described with reference to the specific embodiments. However, it should be noted that the present invention is in no way limited to the details of the illustrated structures but changes and modifications may be made within the scope of the appended claims.

I claim:

1. An accumulating multiplication circuit including a multiplication part and an arithmetical operation part, said multiplication part comprising:

first to four registers for holding most significant "n" bits of a multiplier, where "n" is a positive integer, least significant "n" bits of said multiplier, most significant "n" bits of a multiplicand, and least significant "n" bits of said multiplicand, respectively, a first multiplexor for selecting either an output data of said first register or an output data of said second register, so as to supply the selected output data, a Booth's decoder receiving said selected output data outputted from said first multiplexor, a second multiplexor for selecting either an output data of said third register or an output data of said fourth register, so as to supply the selected output data, a partial product generating circuit receiving an output of said Booth's decoder and an output of said second multiplexor, for generating a partial product, and a partial product adder circuit receiving and summing said partial product from said partial product generating circuit and for outputting the summed result to said arithmetical operation part, said arithmetical operation part comprising:

fifth and sixth registers for respectively holding the most significant "n" bits and the least significant "n" bits of data used for the arithmetical operation with the partial product generated in said multiplication part, a third multiplexor having a first input receiving the "2n" bit—data held in said fifth and sixth registers, a second input receiving 0 and a third input, a shifter receiving an output data of said third multiplexor for shifting the received data rightward by "n" bits, a fourth multiplexor selecting either said output data of said third multiplexor or an output data of the shifter so as to supply the selected data, an arithmetical operation circuit receiving an output of said fourth multiplexor and an output of said partial product adder circuit, for outputting a "2n-bit" output data which is a result of the operation, an output of said arithmetical operation circuit being supplied to said third input of said third multiplexor, and seventh and eighth registers respectively receiving and holding the most significant "n" bits and the least significant "n" bits of said "2n-bit" output data outputted from said arithmetical operation circuit.

2. An accumulating multiplication circuit claimed in claim 1 wherein said arithmetical operation part further includes ninth and tenth registers for receiving and holding data including a first bit to a "n-th" bit of the data outputted by said shifter, and data including a (n–1)th bit to "2n-th" bit of the data outputted by said shifter.

3. An accumulating multiplication circuit, comprising:

a multiplication part for executing an operation for first and second input data, including "n" bits, respectively, and for outputting a first 2n-bit data:

an arithmetical operation part for executing an operation for said first 2n-bit data and a second 2n-bit data and for outputting a third 2n-bit data, a shifter receiving said third 2n-bit data, for shifting said third 2n-bit data rightward by "n" bits so as to output the shifted third 2n-bit data; and a selector receiving said second 2n-bit data and said shifted third 2n-bit data, for selectively supplying said second 2n-bit data as it is to said arithmetical operation part or supplying said shifted third 2n-bit data as said second 2n-bit data inputted to said arithmetical operation part, wherein said multiplication part includes;

first through fourth registers for holding most significant "n" bits of a multiplier, where "n" is a positive integer, least significant "n" bits of said multiplier, most significant "n" bits of a multiplicand, and least significant "n" bits of said multiplicand, respectively, a first multiplexor for selecting either an output data of said first register or an output data of said second register, so as to supply the selected output data, a Booth's decoder receiving said selected output data outputted from said first multiplexor, and a second multiplexor for selecting either an output data of said third register or an output data of said fourth register, so as to supply the selected output data.

4. A multiplication circuit, comprising:

a multiplication part for executing an operation for first and second input data, including "n" bits, respectively, and for outputting a first 2n-bit data;

an arithmetical operation part for executing an operation for said first 2n-bit data and a second 2n-bit data and for outputting a third 2n-bit data, a shifter receiving said third 2n-bit data, for shifting said third 2n-bit data so as to output the shifted third 2n-bit data; and a selector receiving said second 2n-bit data and said shifted third 2n-bit data, for selectively supplying said second 2n-bit data as it is to said arithmetical operation part or supplying said shifted third 2n-bit data as said second 2n-bit data inputted to said arithmetical operation part, wherein said multiplication part includes;

first through fourth registers for holding most significant "n" bits of a multiplier, where "n" is a positive integer, least significant "n" bits of said multiplier, most significant "n" bits of a multiplicand, and least significant "n" bits of said multiplicand, respectively, a first multiplexor for selecting either an output data of said first register or an output data of said second register, so as to supply the selected output data, a Booth's decoder receiving said selected output data outputted from said first multiplexor, and a second multiplexor for selecting either an output data of said third register or an output data of said fourth register, so as to supply the selected output data.

5. An accumulating multiplication circuit as claimed in claim 4, wherein said multiplication part further comprises a partial product generating circuit receiving an output of said Booth's decoder and an output of said second multiplexor, for generating a partial product.

6. An accumulating multiplication circuit as claimed in claim 5, wherein said multiplication part further comprises a partial product adder circuit receiving and summing said partial product from said partial product generating circuit and for outputting the summed result to said arithmetical operation part.

7. An accumulating multiplication circuit as claimed in claim 6, wherein said addition part comprises fifth and sixth registers for respectively holding most significant "n" bits and least significant "n" bits of data used for the arithmetical operation with the partial product generated in said multiplication part.

8. An accumulating multiplication circuit as claimed in claim 7, wherein said addition part further comprises a third multiplexor having a first input receiving the "2n" bit data held in said fifth and sixth registers, a second input receiving 0 and a third input.

9. An accumulating multiplication circuit as claimed in claim 8, wherein said shifter receives an output data of said third multiplexor for shifting the received data rightward by "n" bits.

10. An accumulating multiplication circuit as claimed in claim 9, wherein said addition part further comprises a fourth multiplexor selecting either said output data of said third multiplexor or an output data of the shifter so as to supply the selected data.

11. An accumulating multiplication circuit as claimed in claim 10, wherein said addition part further comprises:

an arithmetical operation circuit receiving an output of said fourth multiplexor and an output of said partial product adder circuit, for outputting a "2n-bit" output data which is a result of the operation, an output of said arithmetical operation circuit being supplied to said third input of said third multiplexor; and seventh and eighth registers respectively receiving and holding the most significant "n" bits and the least significant "n" bits of said "2n-bit" output data outputted from said arithmetical operation circuit.

* * * * *